(12) United States Patent
Varshney

(10) Patent No.: US 10,960,503 B2
(45) Date of Patent: Mar. 30, 2021

(54) STAKED INSTALLATION METHOD

(71) Applicant: Rifast Systems LLC, Lincolnwood, IL (US)

(72) Inventor: Viral Varshney, Buffalo Grove, IL (US)

(73) Assignee: Rifast Systems LLC, Lincolnwood, IL (US)

(*) Notice: Subject to any disclaimer, the term of this patent is extended or adjusted under 35 U.S.C. 154(b) by 194 days.

(21) Appl. No.: 16/212,364

(22) Filed: Dec. 6, 2018

(65) Prior Publication Data

US 2019/0176276 A1 Jun. 13, 2019

Related U.S. Application Data

(60) Provisional application No. 62/596,012, filed on Dec. 7, 2017.

(51) Int. Cl.
*B23P 19/06* (2006.01)
*F16B 37/06* (2006.01)

(52) U.S. Cl.
CPC .......... *B23P 19/063* (2013.01); *F16B 37/065* (2013.01)

(58) Field of Classification Search
CPC .............................. B23P 19/063; F16B 37/065
See application file for complete search history.

(56) References Cited

U.S. PATENT DOCUMENTS

| | | |
|---|---|---|
| 1,112,525 A | 10/1914 | Dabling |
| 1,686,468 A | 10/1928 | Rosenberg |
| 3,137,336 A | 6/1964 | Wing |
| 3,221,791 A | 12/1965 | Rosan |
| 3,242,962 A | 3/1966 | Dupree |
| 3,367,685 A | 2/1968 | Church et al. |

(Continued)

FOREIGN PATENT DOCUMENTS

| | | |
|---|---|---|
| CN | 2012900007170 | 6/2015 |
| DE | 112012004646 | 8/2014 |

(Continued)

OTHER PUBLICATIONS

International Search Report dated Jan. 24, 2013 for PCT/US2012/063780.

(Continued)

*Primary Examiner* — Jason L Vaughan
*Assistant Examiner* — Amanda Kreiling
(74) *Attorney, Agent, or Firm* — Brian G. Gilpin; Godfrey & Kahn, S.C.

(57) ABSTRACT

A fastener is staked to a sheet of equal or higher strength material. The fastener can be staked to a substantially circular shaped opening in the sheet material but other shapes of openings can be used. The opening is prepared by forming serrations in at least a part thereof. The serrations can take many forms and depths depending on the requirements for the particular application and materials being used. The serrations are formed by a doming tool and a punch tool aligned on opposite sides of the sheet material coming together to create the serrations. The nut is inserted into the serrated opening in the sheet material and force is applied to the fastener causing at least a portion of material of the fastener to flow at least partially into the serrations and secure the fastener to the sheet material.

10 Claims, 18 Drawing Sheets

(56) References Cited

U.S. PATENT DOCUMENTS

| | | | |
|---|---|---|---|
| 3,399,705 A | 9/1968 | Breed et al. | |
| 3,461,936 A | 8/1969 | Rosan et al. | |
| 3,526,032 A * | 9/1970 | Pipher | B21J 15/02 |
| | | | 29/509 |
| 3,535,678 A | 10/1970 | Gulistan | |
| 3,578,367 A | 5/1971 | Harvill | |
| 3,782,436 A | 1/1974 | Steiner | |
| 3,926,237 A | 12/1975 | Enders | |
| 3,967,669 A | 7/1976 | Egner | |
| 4,274,460 A | 6/1981 | Egner | |
| 4,432,681 A | 2/1984 | Capuano | |
| 4,543,023 A | 9/1985 | Capuano | |
| 4,637,766 A | 1/1987 | Milliser | |
| 4,713,960 A | 12/1987 | Gassaway | |
| 4,779,326 A | 10/1988 | Ichikawa | |
| 4,797,022 A | 1/1989 | Crigger | |
| 4,812,095 A * | 3/1989 | Piacenti | B21K 1/46 |
| | | | 411/161 |
| 4,826,411 A | 5/1989 | Gaeth | |
| 4,827,756 A | 5/1989 | Crigger | |
| 4,836,043 A | 6/1989 | Morris et al. | |
| 4,940,375 A * | 7/1990 | Marvell | B23P 19/062 |
| | | | 29/432.2 |
| 5,513,933 A | 5/1996 | Rom | |
| 5,613,815 A | 3/1997 | Muller | |
| 5,630,611 A | 5/1997 | Goss et al. | |
| 5,722,139 A | 3/1998 | Ladouceur et al. | |
| 5,743,691 A | 4/1998 | Donovan | |
| 6,012,215 A | 1/2000 | Demoura | |
| 6,125,524 A | 10/2000 | Mueller | |
| 6,174,117 B1 | 1/2001 | Kawantani et al. | |
| 6,190,102 B1 | 2/2001 | Vignotto et al. | |
| 6,318,940 B1 | 11/2001 | Mitts | |
| D479,121 S | 9/2003 | Jurdens | |
| 6,817,815 B2 | 11/2004 | Ross | |
| 7,287,944 B2 | 10/2007 | Ladouceur | |
| 7,293,947 B2 | 11/2007 | Maloney | |
| 7,306,418 B2 | 12/2007 | Komblum | |
| 7,374,381 B2 | 5/2008 | Maloney | |
| 7,465,135 B2 | 12/2008 | Fritsch | |
| 8,011,866 B2 | 9/2011 | Harris | |
| 8,292,562 B2 | 10/2012 | Chiu | |
| 8,366,364 B2 | 2/2013 | Maloney | |
| 8,696,278 B2 | 4/2014 | Babej et al. | |
| 8,979,455 B2 * | 3/2015 | Burton | F16B 33/002 |
| | | | 411/166 |
| 9,574,602 B2 | 2/2017 | Burton | |
| 2002/0172573 A1 | 11/2002 | Pamer et al. | |
| 2005/0226699 A1 | 10/2005 | Kawatani et al. | |
| 2006/0137166 A1 | 6/2006 | Babej et al. | |
| 2006/0204348 A1 | 9/2006 | Shuart | |
| 2007/0166128 A1 * | 7/2007 | Nilsen | F16B 37/065 |
| | | | 411/533 |
| 2015/0167727 A1 | 6/2015 | Burton | |
| 2017/0268553 A1 | 9/2017 | Hirschmann et al. | |

FOREIGN PATENT DOCUMENTS

| | | |
|---|---|---|
| GB | 370948 | 4/1932 |
| WO | PCT/2012/063780 | 5/2013 |

OTHER PUBLICATIONS

Rifast Clinch Fastener Brochure; Nov. 21, 2013.
Rayknurled and Hub Pin Studs, Part No. ADK6019; Nov. 21, 2013.
Forma-Tech Knurled Stud Bolts; Nov. 21, 2013.
International Search Report for PCT Application No. PCT/US18/064310 dated Apr. 3, 2019.
PTC Application Search Report for PCT/US2018/064310 dated Apr. 3, 2019.

* cited by examiner

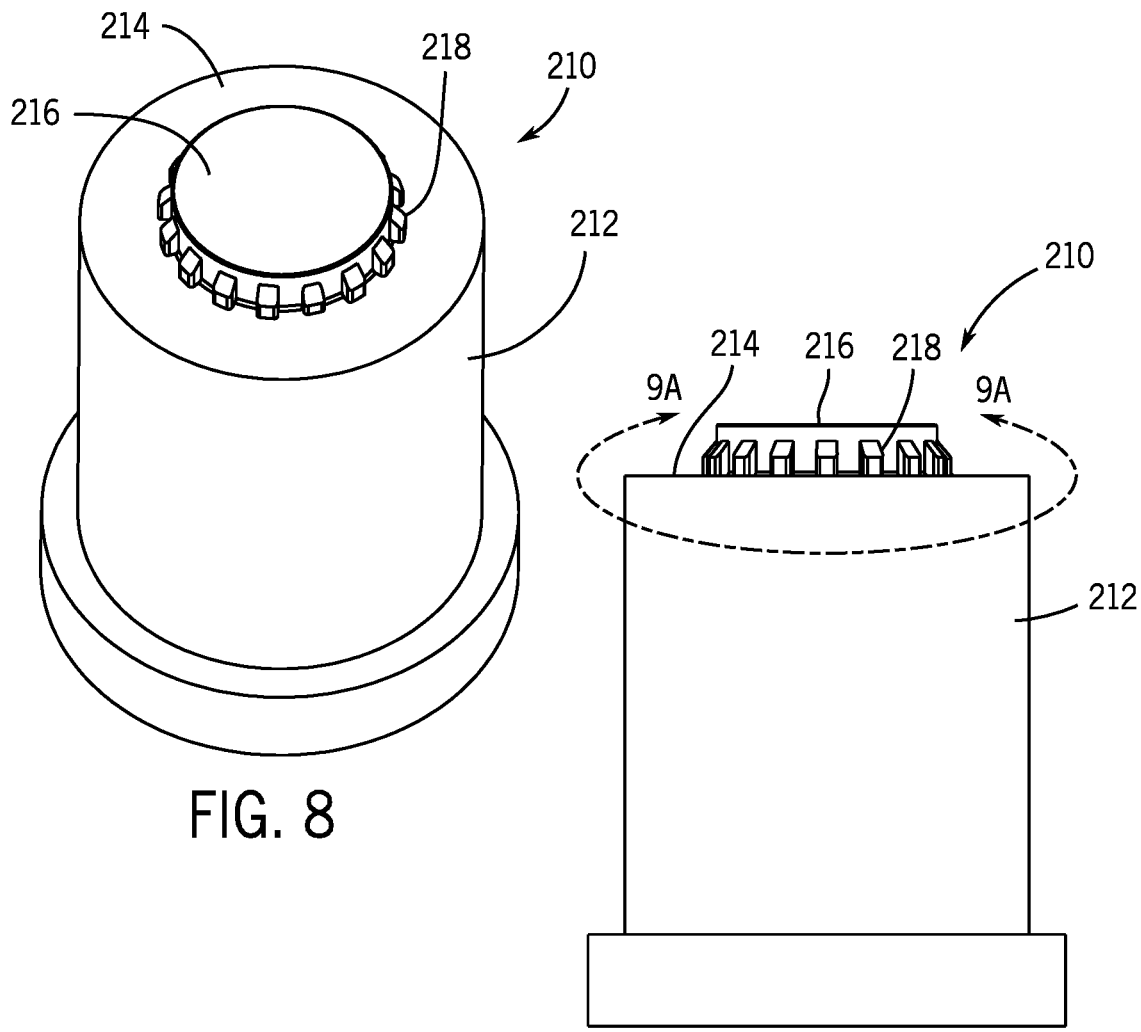
FIG. 8
FIG. 9
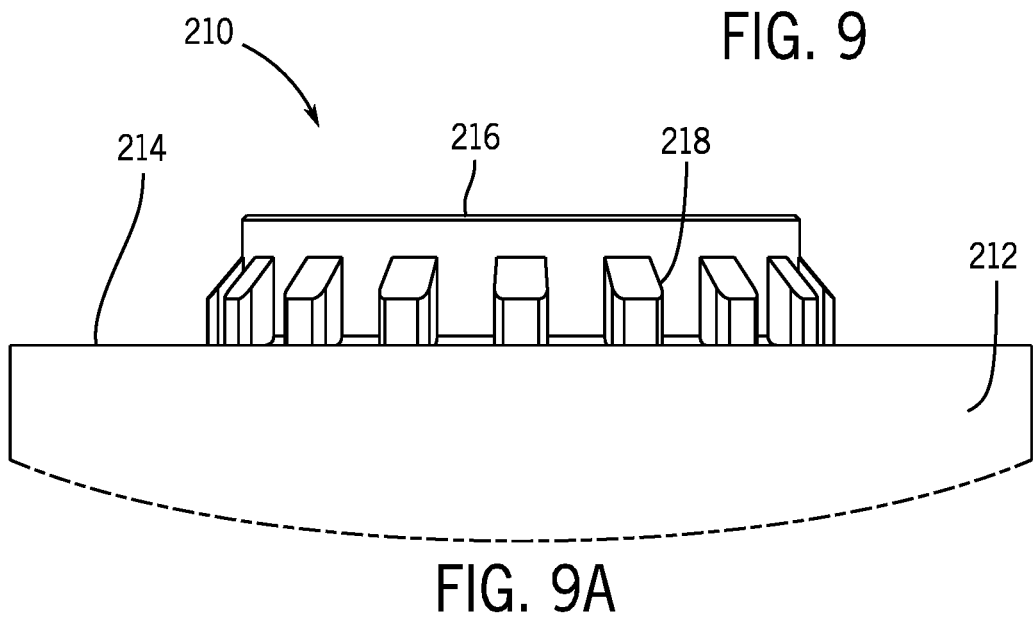
FIG. 9A

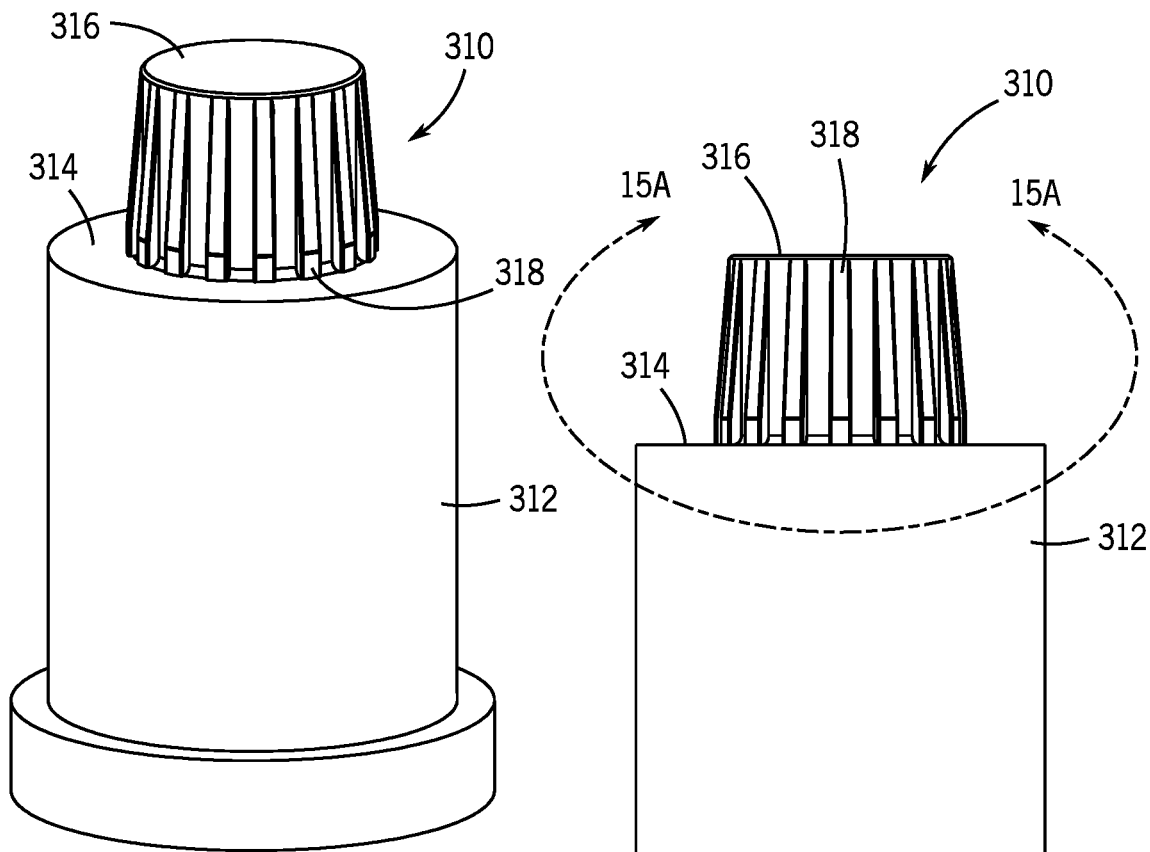
FIG. 14
FIG. 15
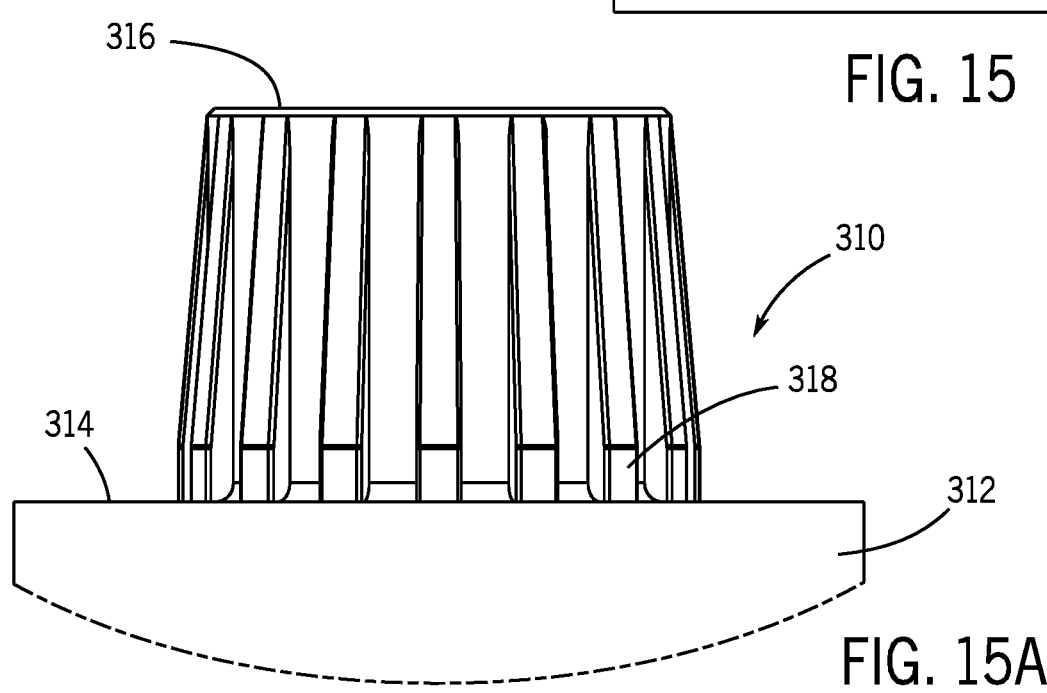
FIG. 15A

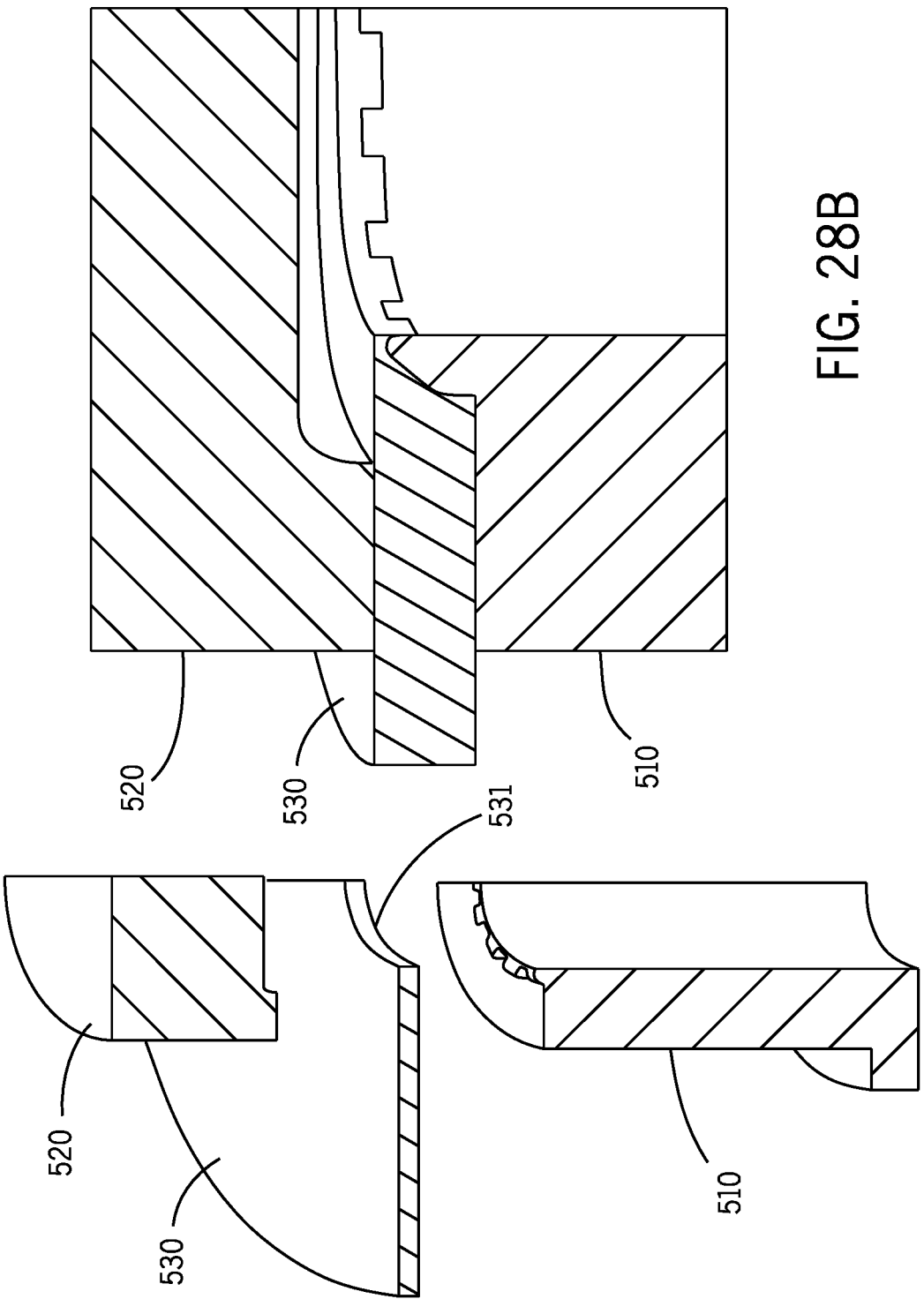

STAKED INSTALLATION METHOD

CROSS REFERENCE TO RELATED APPLICATION

This application claims the benefit of U.S. Provisional Patent Application Ser. No. 62/596,012, filed Dec. 7, 2017, which is incorporated herein by reference in its entirety for all purposes.

FIELD OF THE INVENTION

The present invention relates generally to the field of staking installation to a substrate. More particularly, the present invention relates to a method for installing a fastener by staking the fastener to a high strength material, such as a piece of high strength sheet metal.

BACKGROUND

When a fastener is installed in a material, such as a piece of sheet metal, it is essential that the fastener not become dislodged from the material when an external force pulls or twists on the fastener. Hence, the installed fastener must be capable of resisting both torsional and pull-out forces. As used herein, the term "fastener" may include a nut, stud, post, pin, spacer, tube, or other structure needing to be staked. And it should be understood that references to "fastener" or "nut" could apply to other similar structures being staked.

One method of generating the above resistances that is known in the art involves inserting a high strength nut with exterior serrations into a prepared opening in a piece of sheet metal and then applying a force strong enough to deform the sheet metal, such that the sheet metal fills the gaps between the nut's exterior serrations, leaving the nut secured within the sheet metal. In this method, the sheet metal is deformed, while the nut maintains its shape.

However, particularly in the automotive industry, nuts and other fasteners are being installed in increasingly high strength materials, such as high strength steels with yield strength greater than 700 MPa. Increasing the strength of the material in which the fastener is installed vastly increases the difficulty of deforming the material around the fastener. Therefore, a staked installation method that generates high torsional and pull-out force resistances without requiring the deformation of the high strength material during installation is increasingly valuable.

One installation method aimed at achieving the above goals is disclosed in U.S. Patent Application Publication Number 2017/0268553 to Hirschmann et al. This installation method involves creating a non-circular opening in a piece of high strength material, inserting a nut into the opening, and using a die to deform the nut, such that the deformed nut fills the non-circular opening. The oblong shape of the deformed nut provides torsional resistance against the twisting of the nut within the opening. However, this method does not provide any means for the nut to interlock with the material in which it is installed, and it additionally requires the generation of a non-standard shaped opening, which generally requires specialized tooling.

As such, there is a need for a method of installing a fastener in a piece of high strength material that allows for the fastener to be installed in a standard circular opening and by which the fastener is staked to the piece of high strength material for increased resistance to torsional and pull-out forces.

It will be understood by those skilled in the art that one or more aspects of this invention can meet certain objectives, while one or more other aspects can lead to certain other objectives. Other objects, features, benefits, and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY

Disclosed is a method of staking a fastener in a piece of material. The piece of material is typically a high strength sheet metal material with a strength higher than the fastener. In one embodiment, the fastener is staked to a substantially circular shaped opening in the sheet material but other shapes of openings can be used. A circular opening is preferably used so that lower cost tooling can be used to create the opening and perform the disclosed process. The opening is prepared by forming serrations in at least a part thereof. The serrations can take many forms and depths depending on the requirements for the particular application and materials being used. The serrations are formed by using a doming tool and a punch tool aligned on opposite sides of the sheet material coming together to create the serrations. Once the serrations are formed, the fastener is inserted into the serrated opening in the sheet material and force is applied to the fastener causing at least a portion of material forming the fastener to flow at least partially into the serrations and secure the fastener to the sheet material.

BRIEF DESCRIPTION OF THE DRAWINGS

FIG. 8 is a perspective view of a doming tool used to prepare a serrated opening in the material in accordance with a second embodiment of the present disclosure;

FIG. 9 is a side view of the doming tool of FIG. 8;

FIG. 9A is a detail view of FIG. 9 taken generally of the area indicated by line 9A-9A in FIG. 9;

FIG. 14 is a perspective view of a doming tool used to prepare a serrated opening in the material in accordance with a third embodiment of the present disclosure;

FIG. 15 is a side view of the doming tool of FIG. 14;

FIG. 15A is a detail view of FIG. 15 taken generally of the area indicated by the line 15A-15A in FIG. 15;

FIG. 28A is a detail schematic sectional side view of a setup for a preparation of a serrated opening;

FIG. 28B is a detail schematic sectional side view of the serrated opening preparation process set up in FIG. 28A;

DETAILED DESCRIPTION

Figure 1:
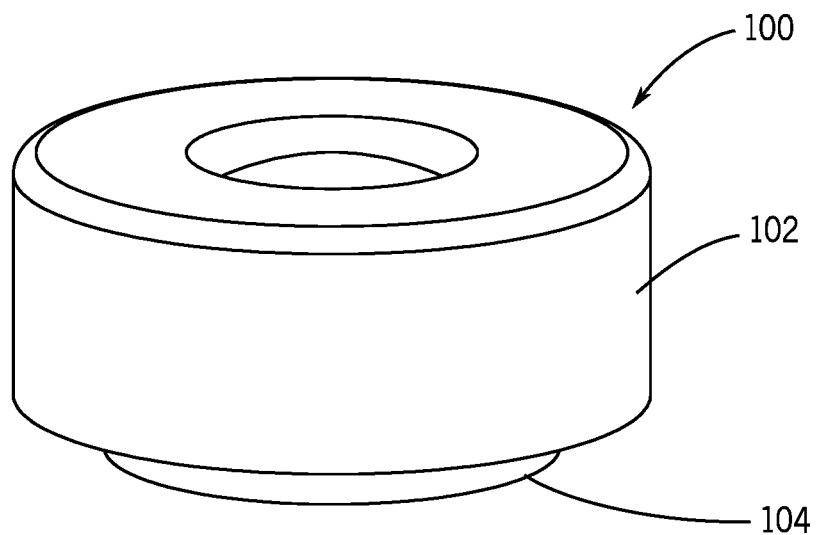
FIG. 1 is perspective view of a nut before the nut is installed in a material in accordance with one embodiment of the present disclosure.
Figure 2:
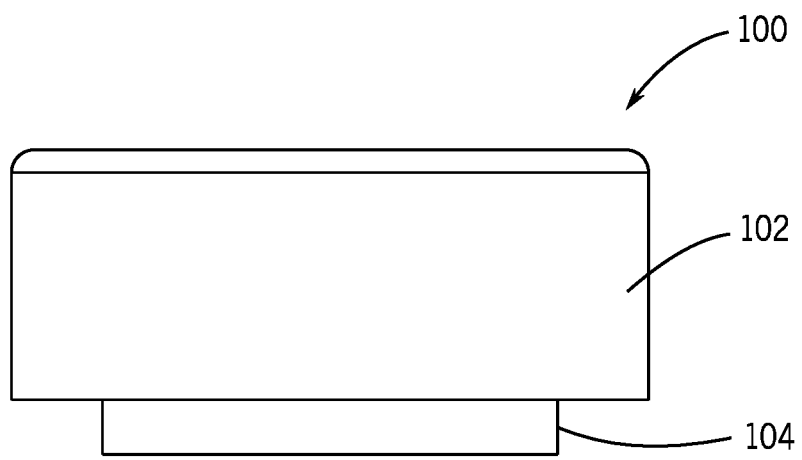
FIG. 2 is a side view of the nut of FIG. 1.

FIGS. 1-2 show a nut 100 in accordance with one embodiment of the present disclosure. The nut 100 has a first collar 102 and a second collar 104 adjacent to the first collar 102. Here, the nut 100 has not yet been deformed by the installation process. Hence, no serrations or other deformations appear on the second collar 104 of the nut 100. In the embodiment shown, the nut 100 is a conventional staked nut, such as the one used in U.S. Patent Application Publication Number 2017/0268553 to Hirschmann et al. In other embodiments not depicted herein, other forms of nuts may be used, including nuts or fasteners with threaded posts, holes, or other structures.

FIGS. 3-7A show one embodiment of a serrated doming tool 110 (shown in FIGS. 3-4A) and a punch tool 120 (shown in FIG. 5) that may be used in accordance with the present disclosure to prepare a serrated opening 132 (shown in FIGS. 6-7A) in a piece of high strength base material. In this embodiment, the piece of high strength base material is a piece of high strength sheet metal 130. Similarly, FIGS. 8-13 show another embodiment of a serrated doming tool 210 (shown in FIGS. 8-9A) and a punch tool 220 (shown in FIG. 10) that may be used in accordance with the present disclosure to prepare a serrated opening 232 (shown in FIGS. 11-12A) in a piece of high strength base material. In this embodiment, the piece of high strength base material is a piece of high strength sheet metal 230. FIG. 13 illustrates the serrated doming tool 210, the piece of high strength sheet metal 230 having a non-serrated hole 231, and the punch tool 220 aligned to prepare the serrated opening 232. This illustration is further representative of how the respective tools in other embodiments may be aligned to accomplish the same staking. FIGS. 14-18A show yet another embodiment of a serrated doming tool 310 (shown in FIGS. 14-15A) and a punch tool 320 (shown in FIG. 16) that may be used in accordance with the present disclosure to prepare a serrated opening 332 (shown in FIGS. 17-18A) in a piece of high strength base material. In this embodiment, the piece of high strength base material is a piece of high strength sheet metal 330.

Figure 3:
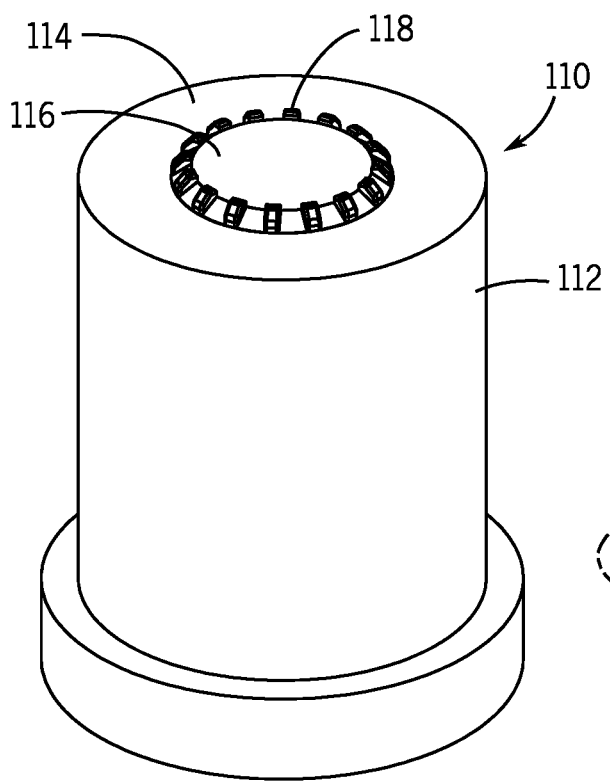
FIG. 3 is a perspective view of a doming tool used to prepare a serrated opening in the material in accordance with one embodiment of the present disclosure.
Figure 4:
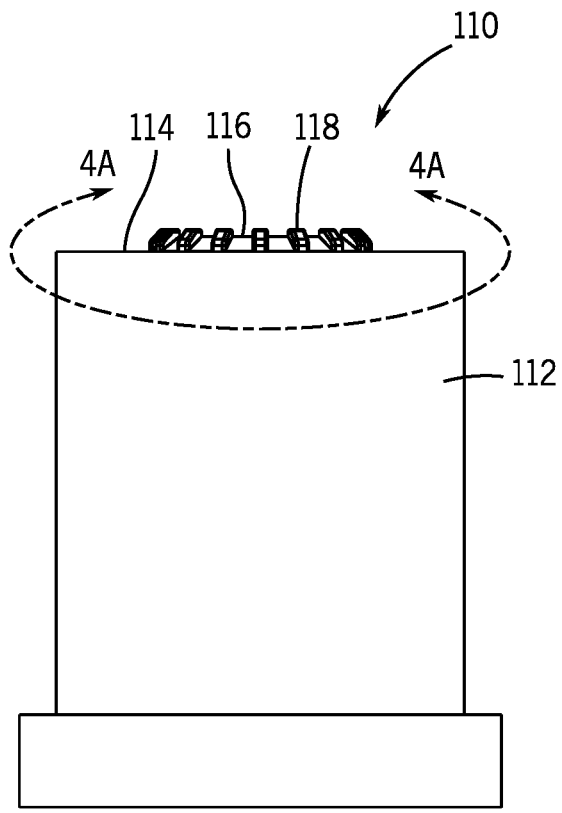
FIG. 4 is a side view of the doming tool of FIG. 3.
Figure 4A:
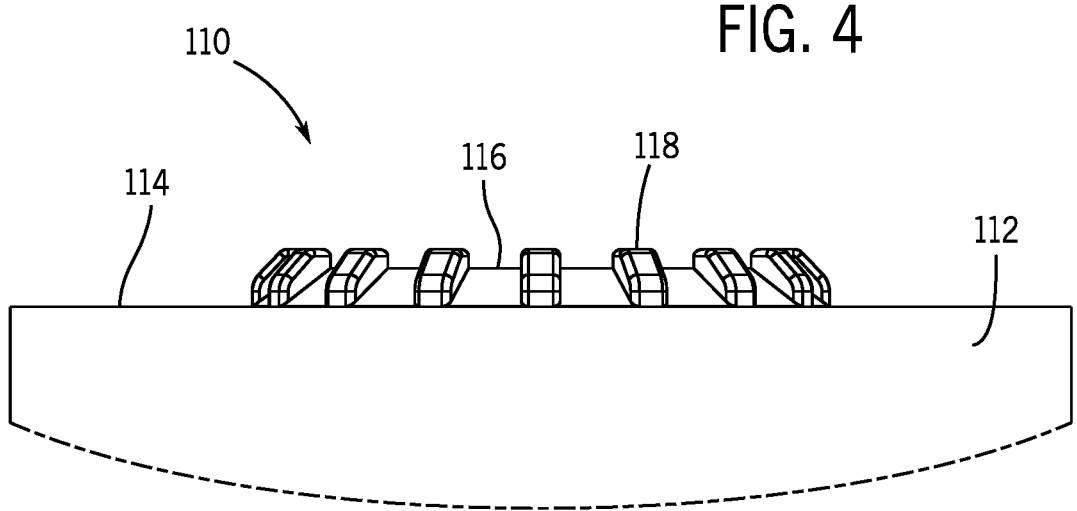
FIG. 4A is a detail view of FIG. 4 taken generally of the area indicated by line 4A-4A in FIG. 4.

FIGS. 3-4A show the serrated doming tool 110 used with the first embodiment of the present disclosure. In this embodiment, the serrated doming tool 110 has a base 112 with a face 114 at one longitudinal end of the base 112. On the face 114, there is a raised portion 116 surrounded by a number of serrations 118. In this embodiment, the raised portion 116 is circular, but in other embodiments, the raised portion need not be circular. In the embodiment shown, there are 16 serrations 118 surrounding the raised portion 116, but in other embodiments, the raised portion 116 may be surrounded by a different number of serrations 118 within the context of the present disclosure. Further, in alternative embodiments, alternative shapes and sizes of serrations 118 may be used. Additionally, in the embodiment shown in FIGS. 3-4A, the serrations 118 begin at the face 114 and extend beyond the raised portion 116. However, in alternative embodiments, the serrations may extend varying distances along and/or beyond the raised portion 116. Additionally, the raised portion 116 may vary in a length in which the raised portion 116 extends beyond the face 114.

Figure 5:
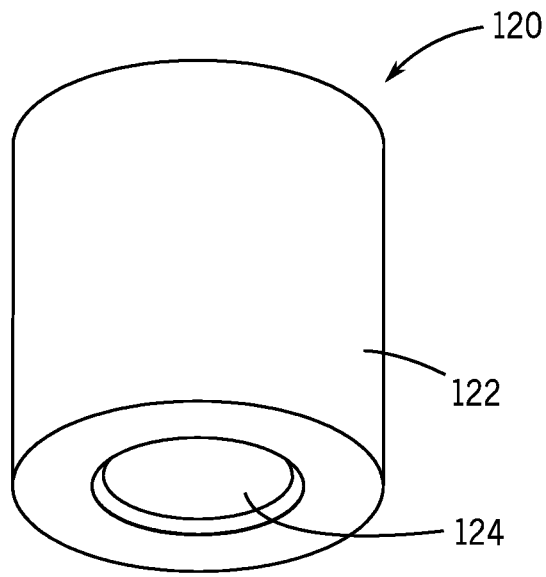
FIG. 5 is a bottom perspective view of a punch tool used with the doming tool of FIG. 3 to prepare the serrated opening in the material in accordance with one embodiment of the present disclosure.
Figure 6:
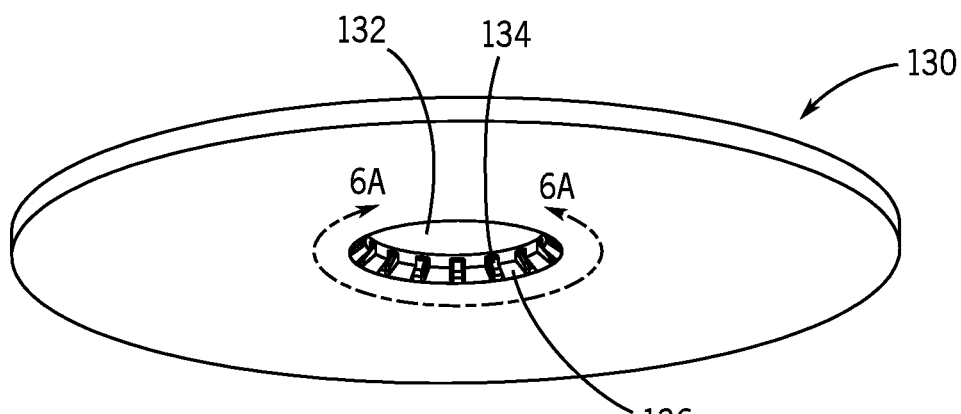
FIG. 6 is a bottom perspective view of a prepared serrated opening in a piece of high strength sheet metal in accordance with one embodiment of the present disclosure.
Figure 6A:
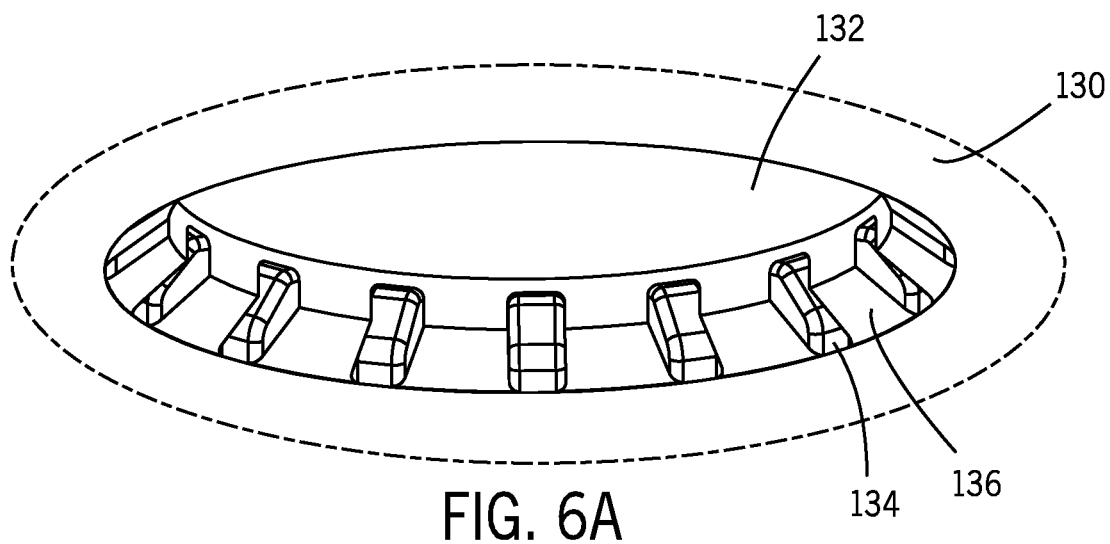
FIG. 6A is a detail view of FIG. 6 taken generally of the area indicated by line 6A-6A in FIG. 6.
Figure 7:
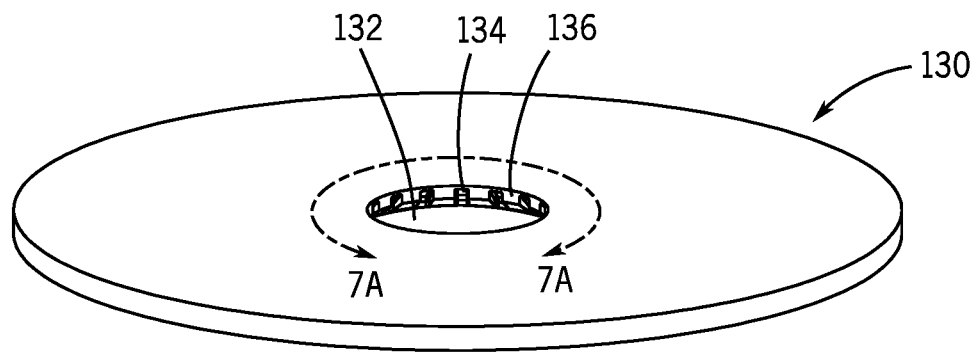
FIG. 7 is a top perspective view of the prepared serrated opening of FIG. 6.
Figure 7A:
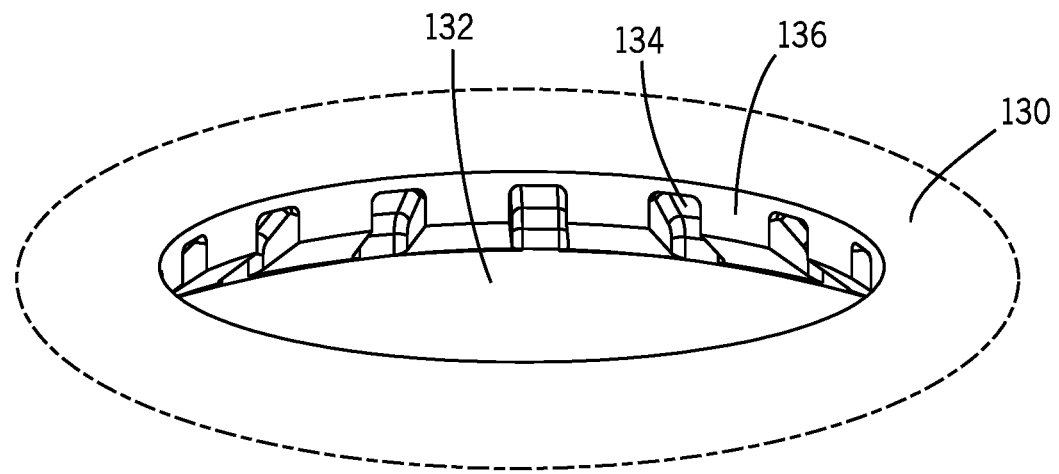
FIG. 7A is a detail view of FIG. 7 taken generally of the area indicated by line 7A-7A in FIG. 7.

FIG. 5 shows one embodiment of the punch tool 120, used in conjunction with the serrated doming tool 110, to prepare the serrated opening 132 (shown in FIGS. 6-7A). The punch tool 120 has a base 122 and an indented portion 124, depressed within the base 122. In the embodiment shown in FIG. 5, the indented portion 124 complements the raised portion 116 of the serrated doming tool 110. In certain embodiments, the indented portion 124 need not be present (as shown in the embodiment illustrated in FIG. 10). In other embodiments, the indented portion 124 may be depressed to a greater or lesser depth within the base 122. One example of this depth variation is illustrated in the punch tool 320 shown in FIG. 16.

FIGS. 6-7A show one embodiment of the serrated opening 132 prepared by the serrated doming tool 110 in conjunction with the punch tool 120 in the piece of high strength sheet metal 130. Testing has established the effectiveness of this installation method in relation to sheet metals of yield strength higher than 700 MPA, but the presently disclosed method is applicable to other materials having greater than or equivalent material strength to at least the second collar 104 of the nut 100.

In each embodiment, prior to the preparation of the serrated opening, the high strength material undergoes a pre-operation where an unprepared opening (lacking serrations) is created. While the shape of the unprepared opening need not necessarily be circular, it may be circular. The ability of the disclosed method to utilize a circular unprepared opening allows more common tooling to be utilized in the pre-operation process, rather than requiring specialty equipment to make an oblong-shaped initial unprepared opening.

Figure 17:
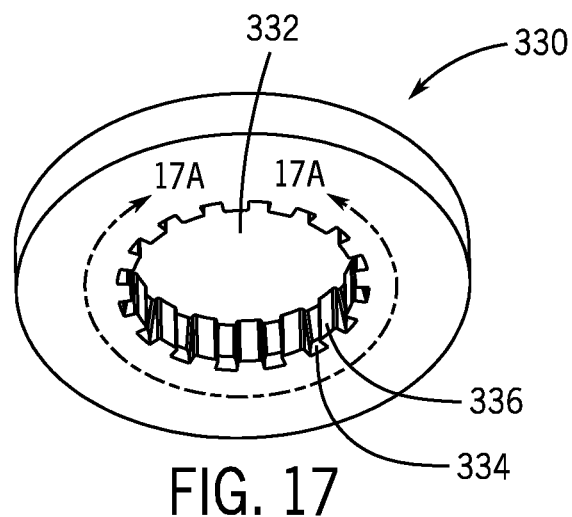
FIG. 17 is a bottom perspective view of a prepared serrated opening in a piece of high strength sheet metal in accordance with the third embodiment of the present disclosure.
Figure 17A:
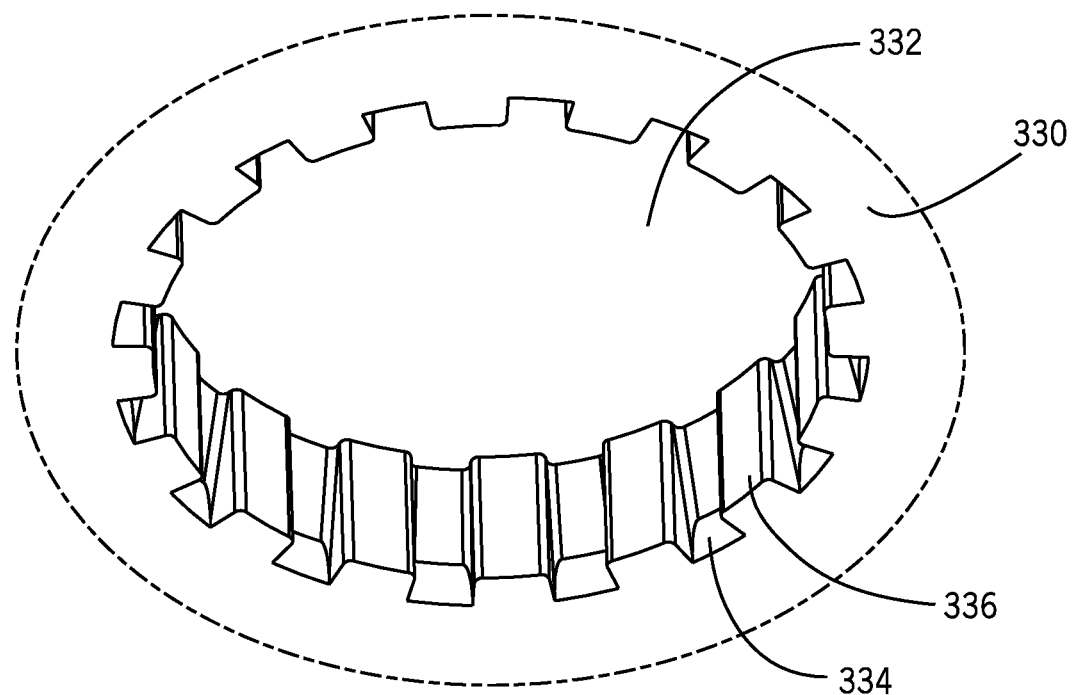
FIG. 17A is a detail view of FIG. 17 taken generally of the area indicated by line 17A-17A in FIG. 17.
Figure 18:
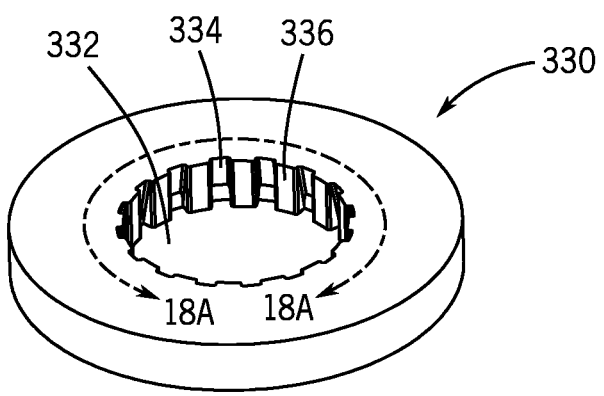
FIG. 18 is a top perspective view of the prepared serrated opening of FIG. 17.
Figure 18A:
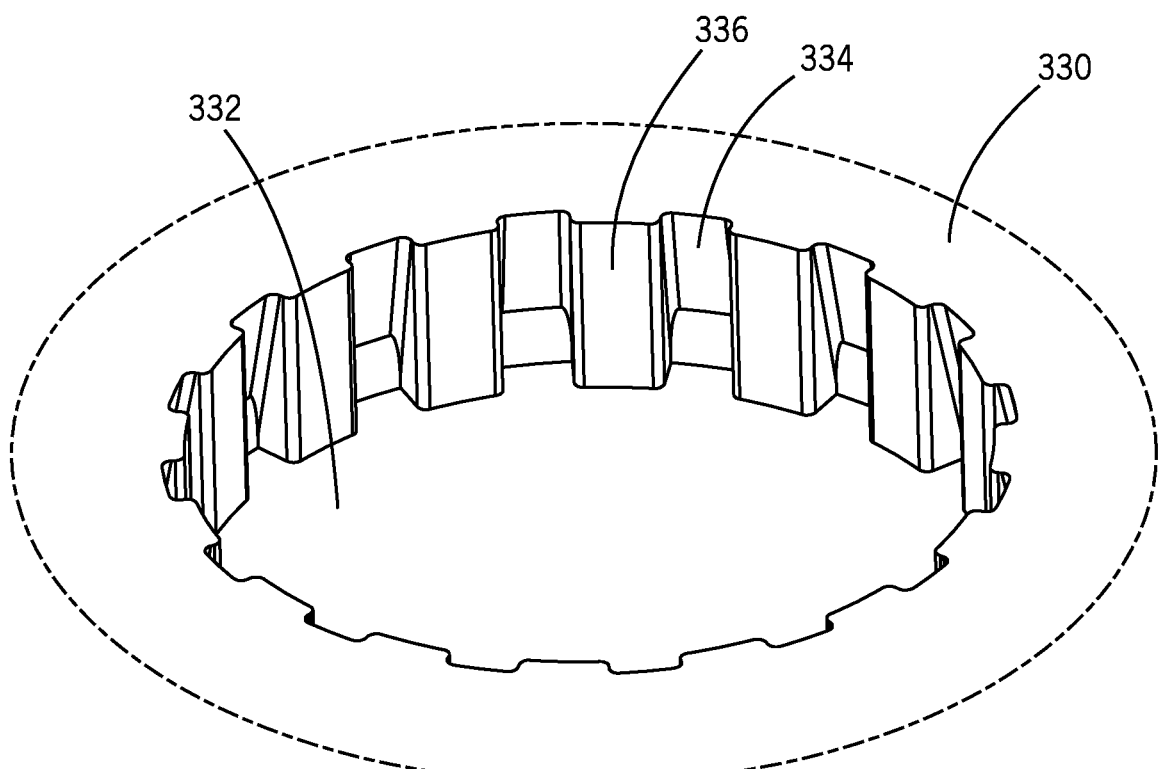
FIG. 18A is a detail view of FIG. 18 taken generally of the area indicated by line 18A-18A in FIG. 18.

In the embodiment shown in FIGS. 6-7A, the serrated opening 132 is prepared when the raised portion 116 of the serrated doming tool 110 is aligned with the indented portion 124 of the punch tool 120 on opposite sides of the unprepared opening in the piece of high strength sheet metal 130, and each applies a coinciding force to the high strength sheet metal 130 forming the unprepared opening. In an embodiment in which the punch tool 120 does not have an indented portion 124, the raised portion 116 of the serrated doming tool 110 may be aligned with the corresponding flat surface in place of the indented portion 124. Once the serrated opening 132 is prepared, the material forming the serrated opening 132 includes a number of gaps 134, corresponding to the serrations 118 forming the raised portion 116 of the serrated doming tool 110, along with a number of serrations 136 between the gaps 134. As previously stated, other numbers and shapes of serrations 118 may be used, which may result in different numbers and shapes of gaps 134. Larger doming tool serrations will generate larger gaps in the serrated opening. Additionally, lengthier doming tool serrations in conjunction with a lengthier doming tool raised portion may generate deeper gaps in an opening. Such variations may allow openings in thicker materials to be serrated (as shown in FIGS. 11-12A) and/or may allow serrations to be prepared along a greater proportion of a full depth of an opening, even through the full depth of an opening in certain embodiments (as shown in FIGS. 17-18A).

FIGS. 8-9A show a second doming tool embodiment, the serrated doming tool 210, having a base 212 with a face 214 at one longitudinal end of the base 212. On the face 214, there is a raised portion 216. As in the previous embodiment, the raised portion 216 in this embodiment is circular and surrounded by serrations 218, although the raised portion need not be circular in all embodiments. In the embodiment shown in FIGS. 8-9A, the serrations 218 begin at the face 214 and extend a partial distance along the raised portion 216.

Figure 10:
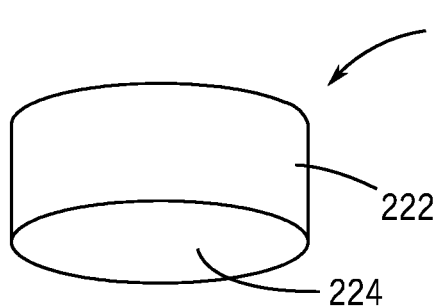
FIG. 10 is a bottom perspective view of a punch tool used with the doming tool of FIG. 8 to prepare the serrated opening in the material in accordance with the second embodiment of the present disclosure.
Figure 11:
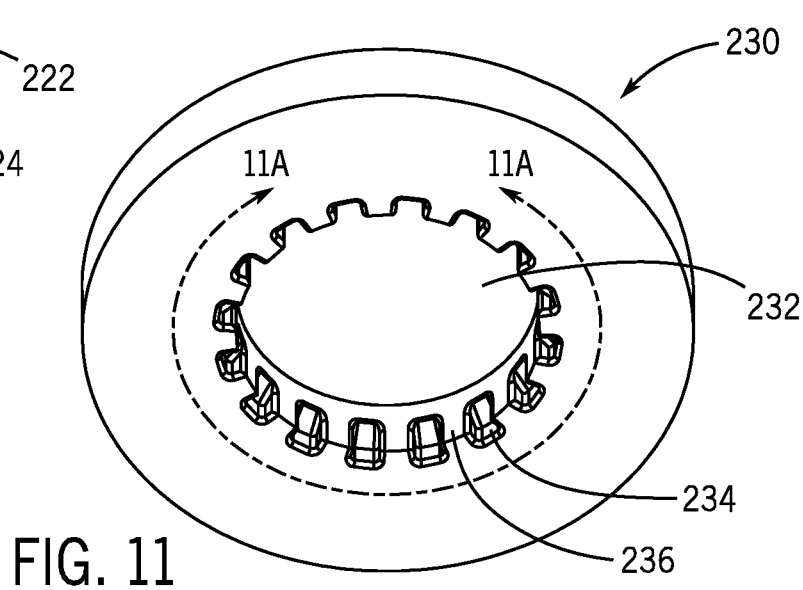
FIG. 11 is a bottom perspective view of a prepared serrated opening in a piece of high strength sheet metal in accordance with the second embodiment of the present disclosure.
Figure 11A:
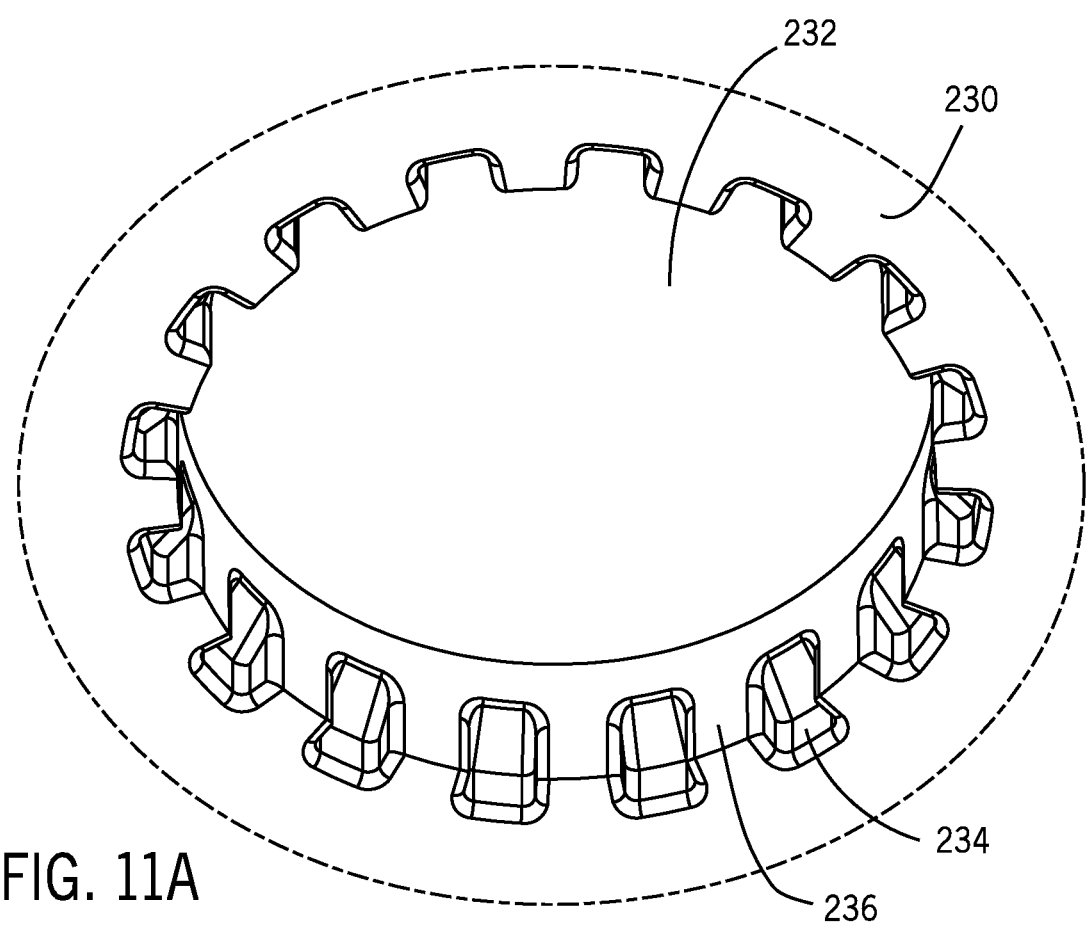
FIG. 11A is a detail view of FIG. 11 taken generally of the area indicated by the line 11A-11A in FIG. 11.
Figure 12:
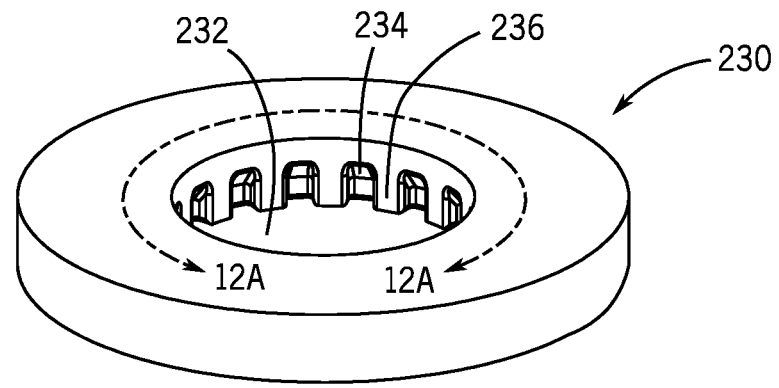
FIG. 12 is a top perspective view of the prepared serrated opening of FIG. 11.
Figure 12A:
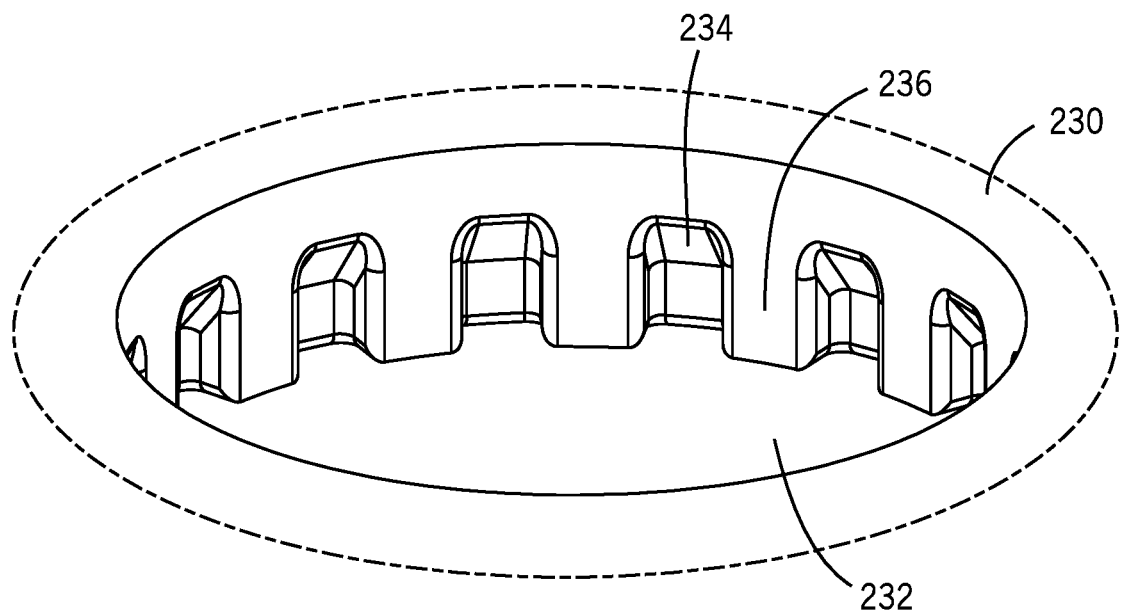
FIG. 12A is a detail view of FIG. 12 taken generally of the area indicated by the line 12A-12A in FIG. 12.
Figure 13:
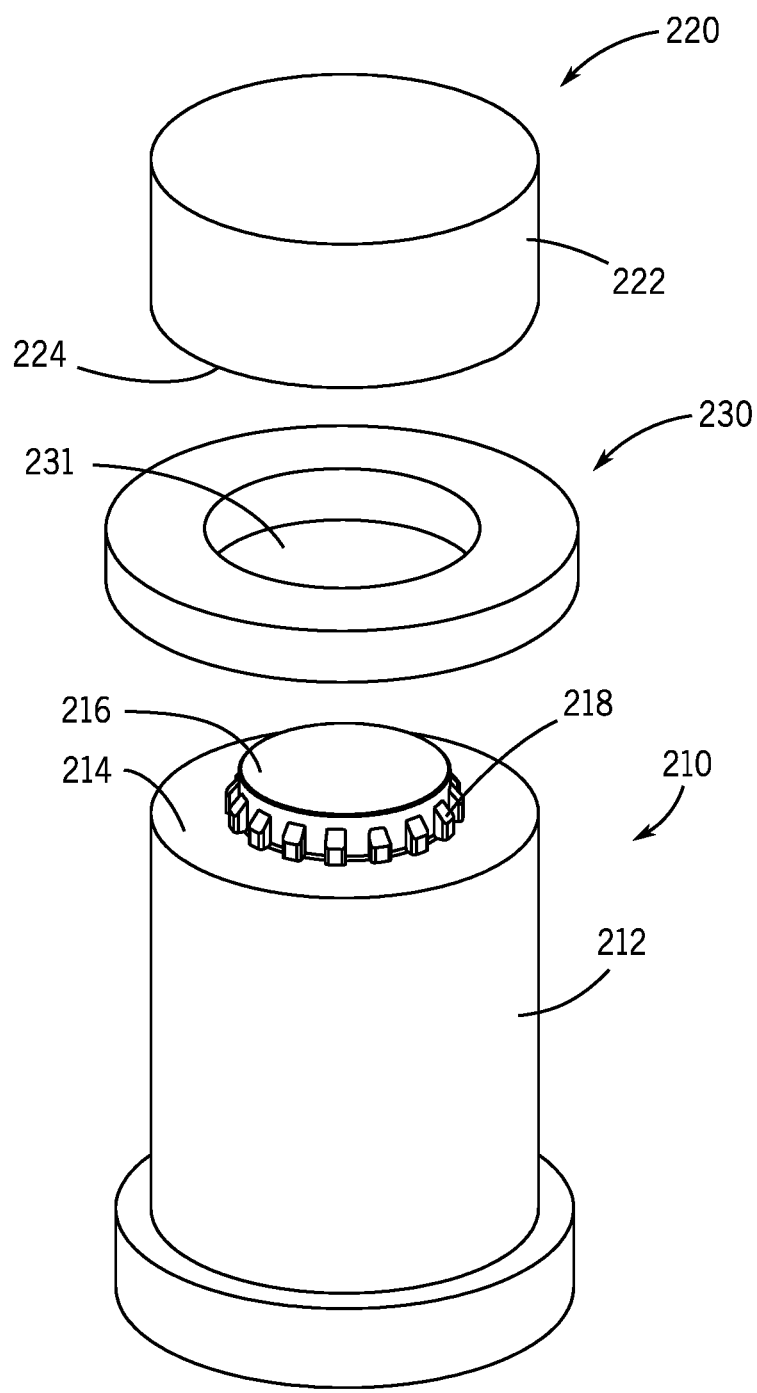
FIG. 13 is a perspective view of the doming tool of FIG. 8, a piece of high strength sheet metal having an unprepared opening, and the punch tool of FIG. 10, aligned in preparation to serrate the unprepared opening in accordance with the second embodiment of the present disclosure.

FIG. 10 show an embodiment of the punch tool 220, used in conjunction with the serrated doming tool 210, to prepare the serrated opening 232 (shown in FIGS. 11-12A). The punch tool 220 has a base 222 and a punching surface 224. In the embodiment shown in FIG. 10, the punching surface is generally flat, lacking a central indented portion like the indented portion 124 shown in the punch tool 120 (shown in FIG. 5). However, in other embodiments, a punch tool having an indented portion complementing the raised portion 216 of the serrated doming tool 210 could be used in conjunction with the serrated doming tool 210.

FIGS. 11-12A show an embodiment of the serrated opening 232 prepared by the serrated doming tool 210 in conjunction with the punch tool 220 in the piece of high strength sheet metal 230. In the embodiment shown in FIGS. 11-12A, the serrated opening 232 is prepared when the raised portion 216 of the serrated doming tool 210 is aligned with the punching surface 224 of the punch tool 220 on opposite sides of an unprepared opening in the piece of high strength sheet metal 230 (as shown in FIG. 13), and each applies a coinciding force to the high strength sheet metal 230 forming the unprepared opening. In other embodiments, the alignment of respective punch tools, high strength materials, and doming tools may be similar under the present disclosure. In an embodiment in which the punch tool 220 has an indented portion, the raised portion 216 of the doming tool may be aligned with the indented portion.

Once the serrated opening 232 is prepared, the material forming the serrated opening 232 includes a number of gaps 234, corresponding to the serrations 218 surrounding the raised portion 216 of the serrated doming tool 210, along with a number of serrations 236 between the gaps 234. As previously mentioned, other numbers and shapes of serrations 218 may be used which may result in different numbers and shapes of the gaps 234.

FIGS. 14-15A show a third doming tool embodiment, the serrated doming tool 310 having a base 312 with a face 314 at one longitudinal end of the base 312. On the face 314, there is a raised portion 316. As in the previous embodiments, the raised portion 316 in this embodiment is circular and surrounded by serrations 318, although the raised portion need not be circular in all embodiments. In the embodiment shown in FIGS. 14-15A, the serrations 318 begin at the face 314 and extend a full length of the raised portion 316.

Figure 16:
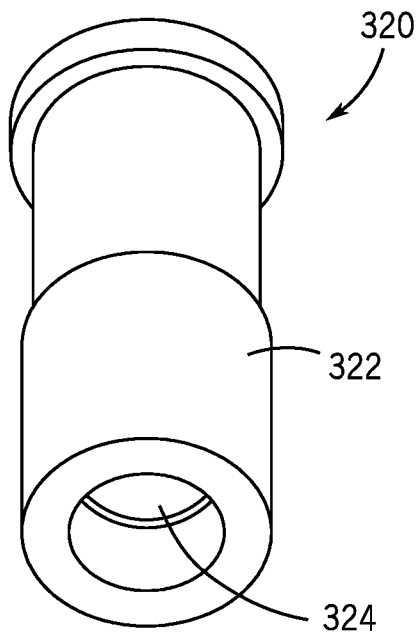
FIG. 16 is a bottom perspective view of a punch tool used in conjunction with the doming tool of FIG. 14 to prepare the serrated opening in the material in accordance with the third embodiment of the present disclosure.

FIG. 16 shows an embodiment of the punch tool 320, used in conjunction with the serrated doming tool 310, to prepare the serrated opening 332 (shown in FIGS. 17-18A). The punch tool 320 has a base 322 and an indented portion 324 depressed within the base 322. In the embodiment shown in FIG. 16, the indented portion 324 complements the raised portion 316 of the serrated doming tool 310.

FIGS. 17-18A show an embodiment of the serrated opening 332 prepared by the serrated doming tool 310 in conjunction with the punch tool 320 in the piece of high strength sheet metal 330. In the embodiment shown in FIGS. 17-18A, the serrated opening 332 is prepared when the raised portion 316 of the serrated doming tool 310 is aligned with the indented portion 324 of the punch tool 320 on opposite sides of an unprepared opening in the piece of high strength sheet metal 330 and each applies a coinciding force to the high strength sheet metal 330 forming the unprepared opening. In this embodiment, the serrations extend a full depth of the serrated opening 332 once the serrated opening 332 has been prepared. This is in contrast to other embodiments, such as the embodiments shown in FIGS. 6-7A and in FIGS. 11-12A, in which the serrations extend only part way through the depth of each respective opening. In this embodiment, the piece of high strength sheet metal is approximately 3.5 millimeters thick. However, in other embodiments, pieces of high strength material having alternative thicknesses may be utilized.

Once the serrated opening 332 is prepared, the material forming the serrated opening 332 includes a number of gaps 334, corresponding to the serrations 318 surrounding the raised portion 316 of the serrated doming tool 310, along with a number of serrations 336 between the gaps 334. As previously mentioned, other numbers and shapes of serrations 318 may be used which may result in different numbers and shapes of gaps 334.

Figure 19:
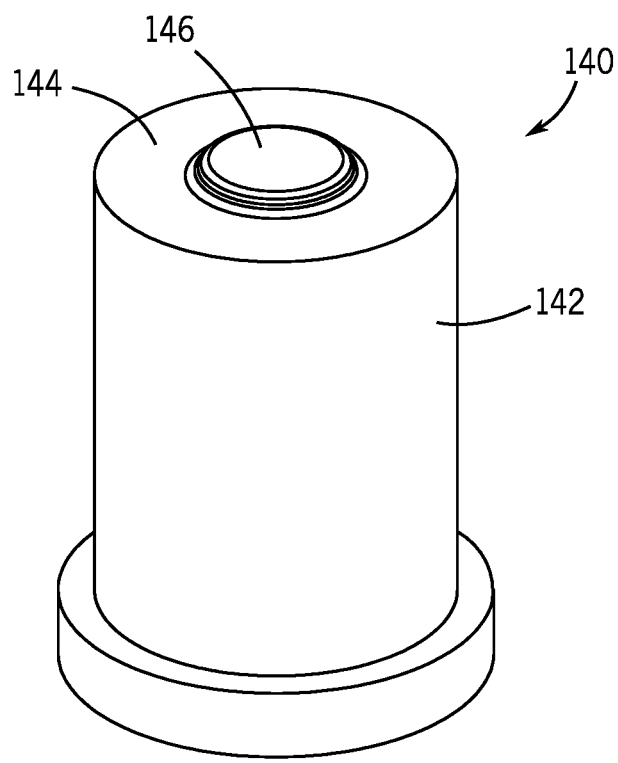
FIG. 19 is a perspective view of a staking die used to deform the nut during installation in accordance with one embodiment of the present disclosure.
Figure 20:
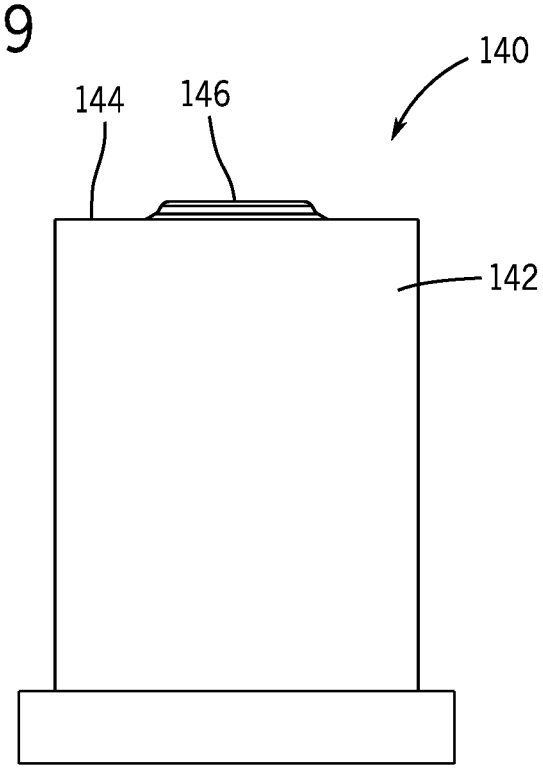
FIG. 20 is a side view of the staking die of FIG. 19.
Figure 21:
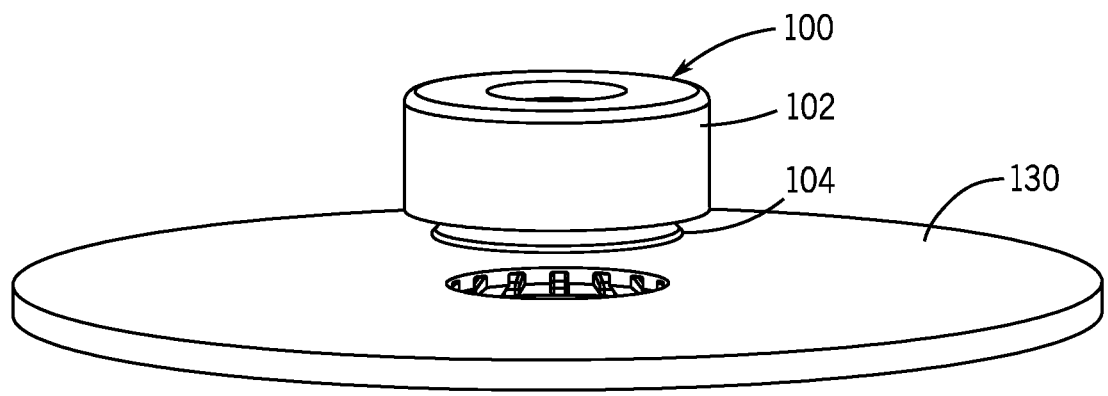
FIG. 21 is an exploded perspective view of the nut of FIG. 1, shown partially deformed during installation into the prepared serrated opening of FIG. 7.
Figure 22:
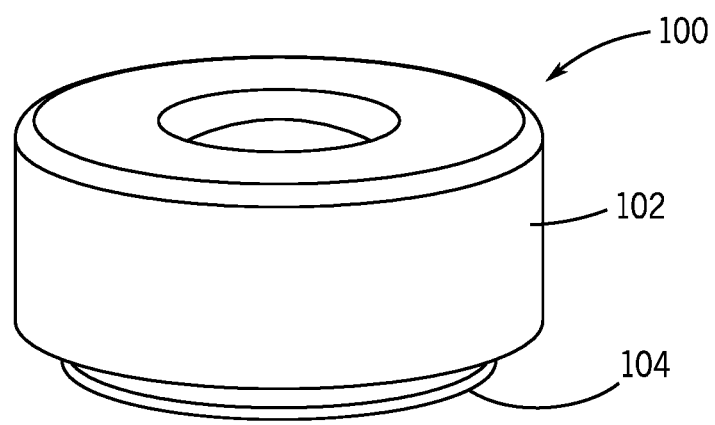
FIG. 22 is a perspective view of the partially deformed nut of FIG. 21.
Figure 23:
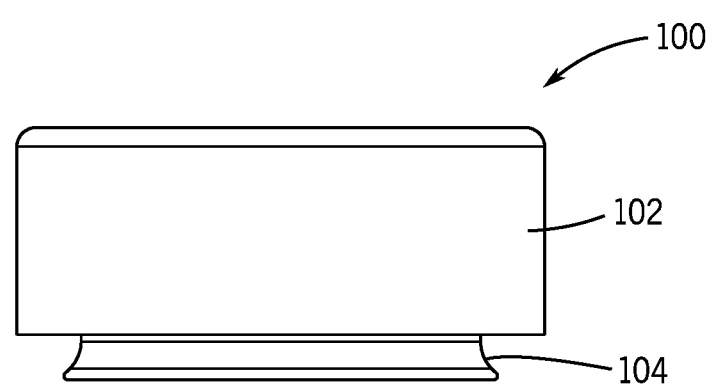
FIG. 23 is a side view of the partially deformed nut of FIG. 21.

FIGS. 19-20 show one embodiment of a staking die 140. In this embodiment, the staking die 140 has a base 142, a face 144 at one longitudinal end of the base 142, and a raised portion 146 protruding from the face 144. When the nut 100 is positioned within the serrated opening 132, the raised portion 146 of the staking die 140 is aligned with the serrated opening 132, and a force is applied to the second collar 104 of the nut 100 sufficient to cause at least the second collar 104 to deform. In the embodiment shown, the second collar 104 deforms while the first collar 102 remains undeformed. FIGS. 21-23 show the nut 100 part way through installation. As staking die 140 applies the force to the nut 100, the second collar 104 of the nut 100 begins to flare out.

Figure 24:
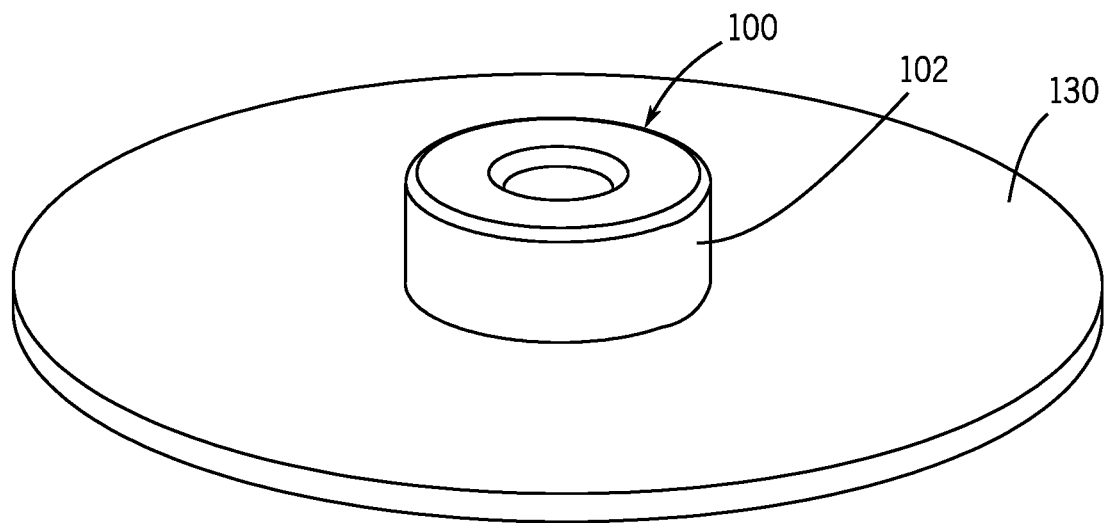
FIG. 24 is a top perspective view of the nut of FIG. 1, shown after installation into the prepared serrated opening of FIG. 7 in accordance with one embodiment of the present disclosure.
Figure 25:
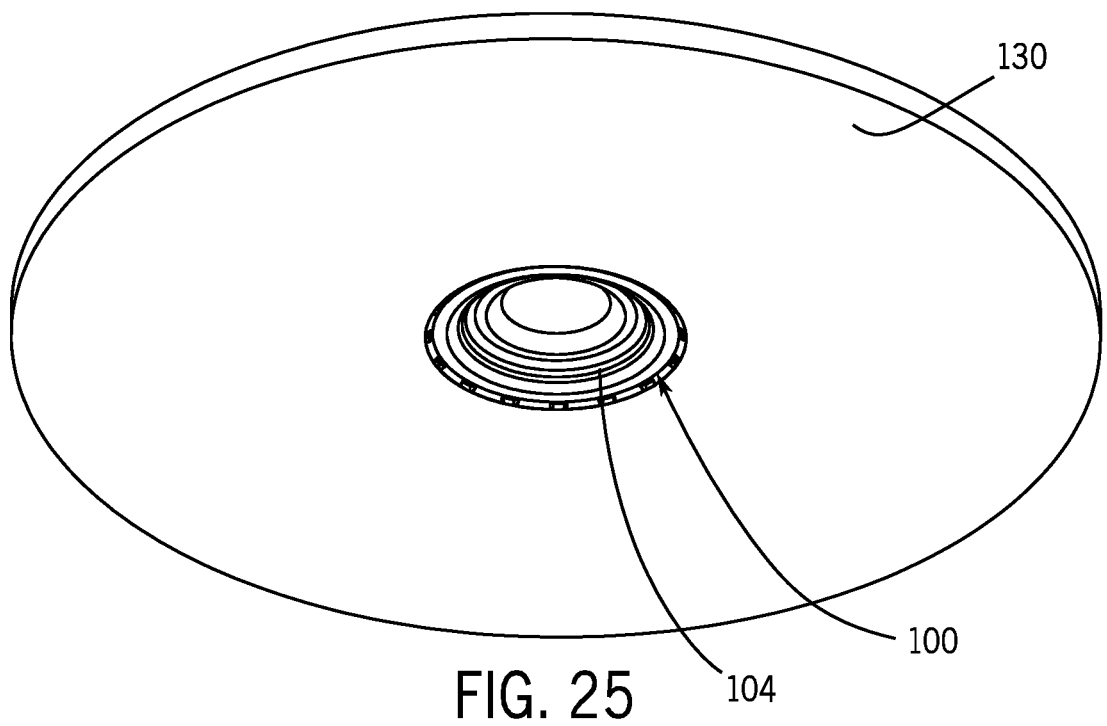
FIG. 25 is a bottom perspective view of the installed nut of FIG. 24.

FIGS. 24-25 next show the nut 100 fully installed in the piece of high strength sheet metal 130. After the second collar 104 flares out, as shown in FIGS. 21-23, the second collar 104 continues to deform, flowing into the gaps 134 between the serrations 136 and staking the nut to the piece of high strength sheet metal 130. In some embodiments, the flow of the material forming the second collar 104 substantially fills the gaps 134, i.e. completely fills the gaps 134 with the exception of a margin of error that may result from small imperfections or defects in the material surrounding the serrated opening 132. However, in other embodiments, the material forming the second collar 104 need not substantially fill the gaps 134, as long as the gaps 134 are filled sufficiently to stake the nut 100 to the piece of high strength sheet metal 130. FIG. 25 shows the second collar 104 of the installed nut 100 covering the gaps 134 and serrations 136 in the material forming the serrated opening 132. Hence, after installation, the second collar 104 of the nut 100 is staked to the piece of high strength sheet metal 130, allowing the nut 100 to be secured against both torsional and pull-out forces. The above-described staking method may be carried out in the same manner using serrated openings in other high strength materials and/or prepared according to other embodiments of the present disclosure.

Figure 26:
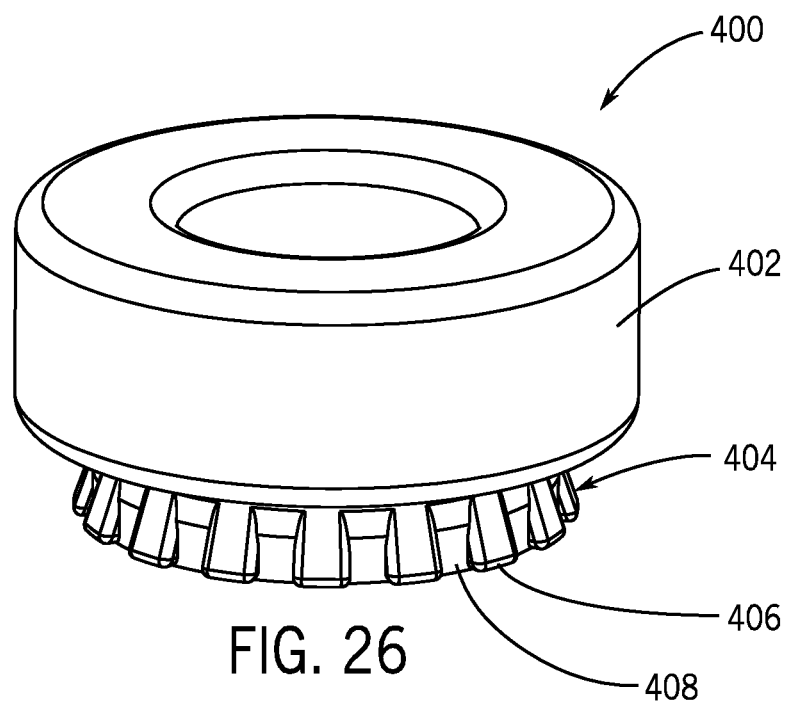
FIG. 26 is a perspective view of a fully deformed nut in accordance with one embodiment of the present disclosure.
Figure 27:
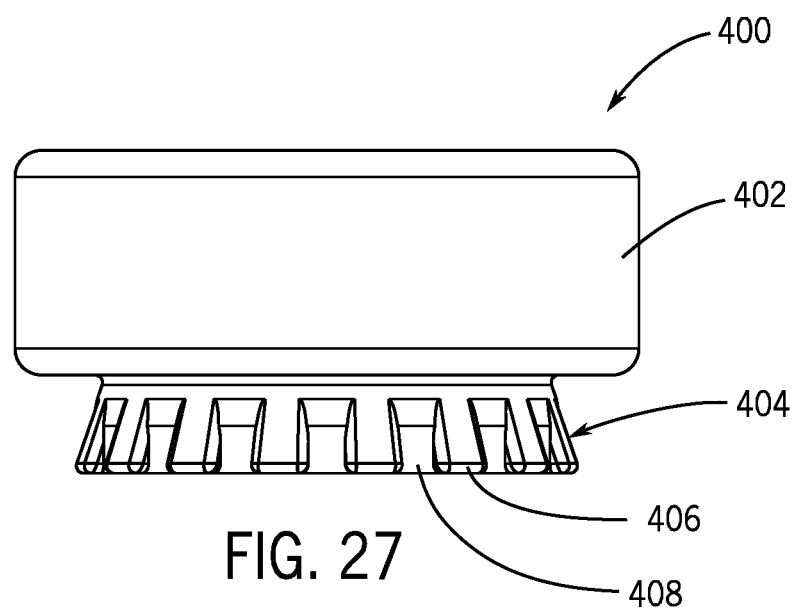
FIG. 27 is a side view of the fully deformed nut of FIG. 26.

FIGS. 26-27 illustrate a nut 400 after the nut 400 has been fully installed in a serrated opening in a piece of high strength material according to the disclosed staking method, with the high strength material removed for clarity. In the embodiment shown, the nut 400 has a first collar 402 and a second collar 404. In the second collar 404, a set of serrations 406 are shown where the second collar 404 flowed into gaps in the serrated opening, the serrations 406 separated by gaps 408. Note that the particular configuration for the serrations and gaps depicted on the second collar 404 do not correspond to one of the previously disclosed embodiments but are illustrative of an additional embodiment.

Figure 28:
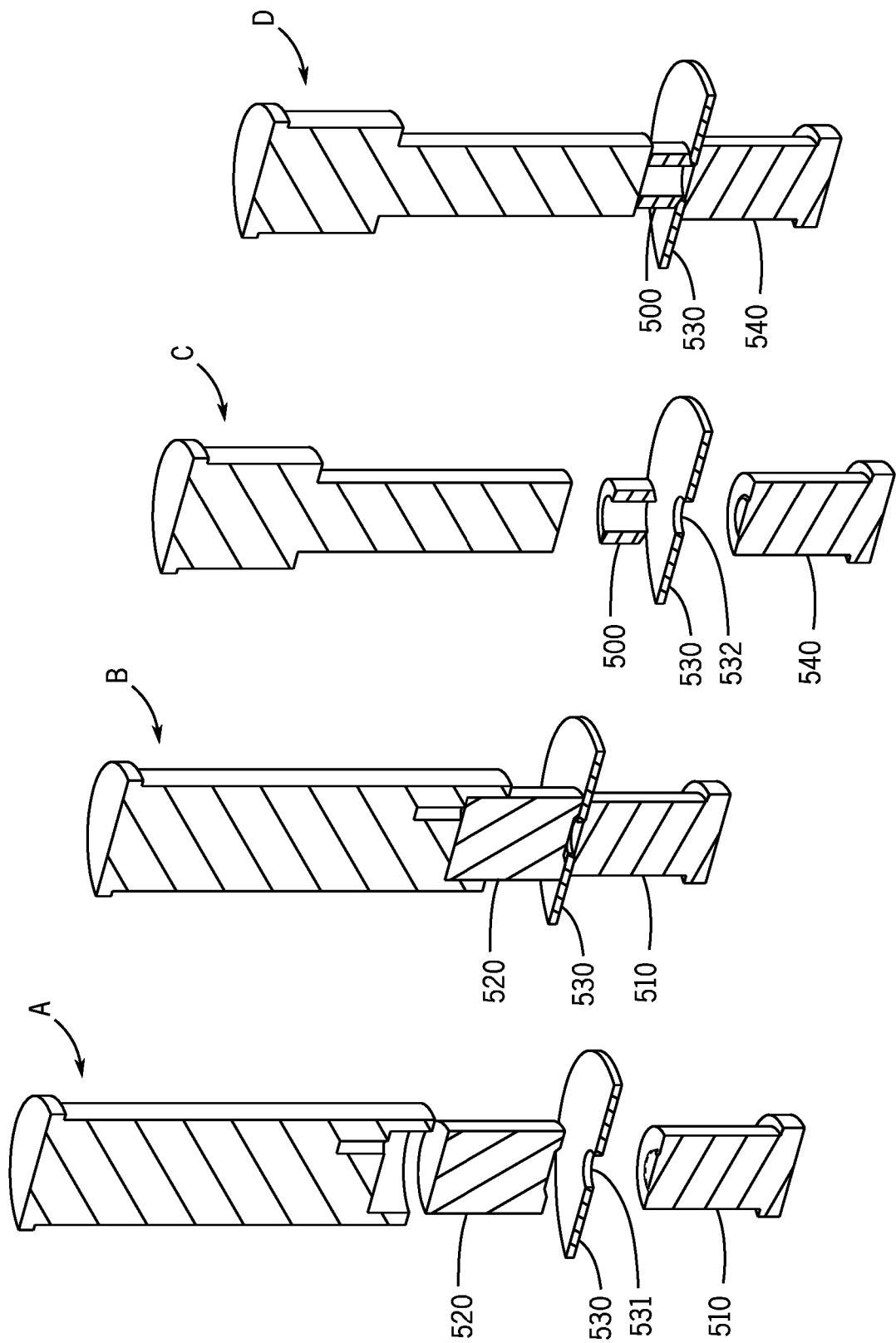
FIG. 28 shows schematic cross sectional perspective views of a series of material preparation and nut installation steps in accordance with one embodiment of the present disclosure.
Figure 28D:
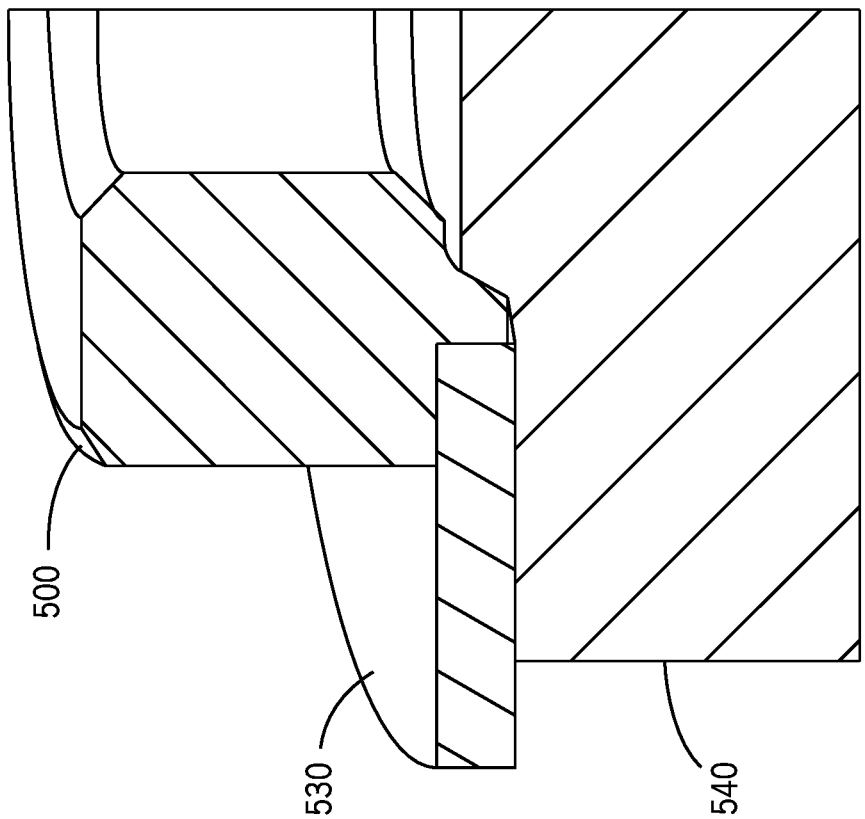
FIG. 28D is a schematic sectional side view of the nut installation process set up in FIG. 28C.
Figure 28C:
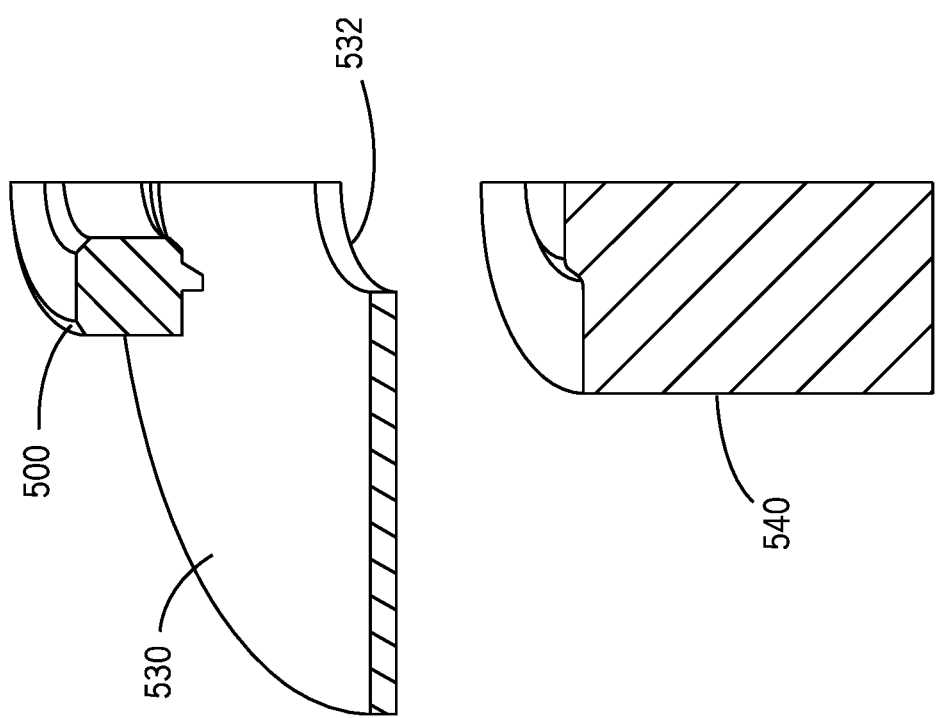
FIG. 28C is a detail schematic sectional side view of a setup for installing a nut in the serrated opening prepared in the steps shown in detail in FIGS. 28A-28B.

FIGS. 28-28D show schematic illustrations of the material preparation steps and nut installation steps disclosed above, according to one embodiment of the present disclosure. Step A, shown in greater detail in FIG. 28A, shows a doming tool 510 aligned with a punch tool 520 on opposing sides of a piece of high strength sheet metal 530 having a non-serrated opening 531. Step B, shown in greater detail in FIG. 28B, shows the doming tool 510 and the punch tool 520 applying coinciding forces to the piece of high strength sheet metal 530, preparing a serrated opening 532. Step C, shown in greater detail in FIG. 28C, shows a nut 500 about to be positioned within the serrated opening 532, with a staking tool 540 located on an opposing side of the serrated opening 532. Finally, step D, shown in greater detail in FIG. 28D, shows the nut 500 positioned within the serrated opening 532, while the staking tool 540 applies a force to the nut 500, staking the nut 500 to the piece of high strength sheet metal 530. In the schematic illustrations shown in FIGS. 28 and 28C-28D, the serrated opening 532 is not shown in great enough detail to show the individual serrations, the formation of which is illustrated in FIG. 28B. However, the change in name and reference numeral from the non-serrated opening 531 to the serrated opening 532 is meant to signify the shift that occurs after the preparation of the opening, in conjunction with the clear depiction of the serrated opening being prepared in FIG. 28B.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A method for installing a fastener in a piece of base material, the method comprising forming a non-serrated opening within the base material;

preparing a serrated opening in at least a portion of the non-serrated opening and sized to receive the fastener in the piece of base material, such that an edge of the serrated opening includes a plurality of edge serrations with edge spaces formed between the plurality of edge serrations, wherein the step of preparing the serrated opening is accomplished by aligning a doming surface of a doming tool, the doming surface including a raised portion surrounded by a plurality of doming serrations, with a punching surface of a punch tool on opposing sides of the non-serrated opening and applying coinciding forces to the base material forming the opening using the doming surface of the doming tool and the punching surface of the punch tool;

inserting the fastener into the serrated opening, the fastener comprised, at least in part, of a material having lesser or equivalent material strength compared to that of the base material; and staking the fastener to the base material by deforming the fastener with an application of force to the fastener sufficient to cause a portion of the fastener to flow into the edge spaces between the plurality of edge serrations.

2. The method of claim 1, wherein the step of preparing the serrated opening is accomplished using a punching surface having an indented portion, and wherein the step of preparing of the serrated opening includes aligning the indented portion of the punching surface with the raised portion of the doming surface before applying the coinciding forces to the base material forming the opening.

3. The method of claim 2, wherein the step of preparing the serrated opening is accomplished using a doming tool having doming serrations of sufficient shape and size to generate edge serrations throughout a full depth of the serrated opening.

4. The method of claim 3, wherein the step of staking the fastener includes a portion of the material comprising the fastener substantially filling the edge spaces between the edge serrations.

5. The method of claim 4, wherein the step of staking the fastener is accomplished using a staking die.

6. The method of claim 5, wherein the step of staking the fastener is accomplished using a staking surface of the staking die, the staking surface including a raised portion generally corresponding in shape to the shape of the serrated opening.

7. The method of claim 6, wherein the step of forming the non-serrated opening is accomplished using a piece of tooling having a circular face, generating a circular non-serrated opening.

8. The method of claim 7, wherein the step of forming the non-serrated opening is accomplished using a piece of sheet metal for the non-serrated opening to be prepared within.

9. The method of claim 8 wherein the steps of inserting and staking the fastener are accomplished using a fastener chosen from the group consisting of a nut, a stud, a post, a pin, a spacer, and a tube.

10. A method for installing a nut in a piece of sheet metal having a substantially circular opening sized to receive the nut, the method comprising:

serrating the substantially circular opening, such that an edge of the sheet metal forming the serrated opening includes a plurality of edge serrations with edge spaces formed between the plurality of edge serrations, the serrating step including
aligning a doming surface of a doming tool with a complementary punching surface of a punch tool on opposing sides of the substantially circular opening in the piece of sheet metal, the doming surface including a substantially circular raised portion surrounded by a plurality of doming serrations, and the punching surface including a substantially circular indented portion having a circumference sufficient to encircle the raised portion and doming serrations of the doming surface; and
applying coinciding forces to the piece of sheet metal using the doming surface of the doming tool and the punching surface of the punch tool;
inserting a nut into the serrated opening, the nut having a first collar and a second collar, the second collar aligned adjacent to and having a smaller circumference than the first collar and at least the second collar being comprised of a material having lesser or equivalent material strength compared to the sheet metal; and
applying a staking force to the second collar using a staking surface of a staking tool, the staking surface including a raised circular portion, the staking force sufficient to cause a portion of the material comprising the second collar to flow into and substantially fill the edge serration gaps.

* * * * *